April 18, 1967   J. J. DAU   3,314,206
DIMENSIONALLY STABLE LAMINATED WOODEN WORK SURFACE
Filed March 6, 1964
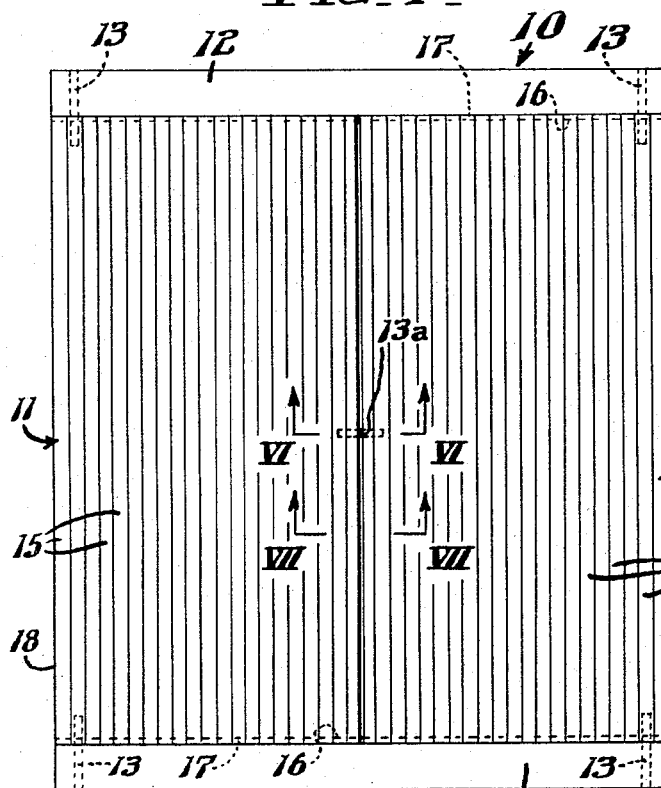
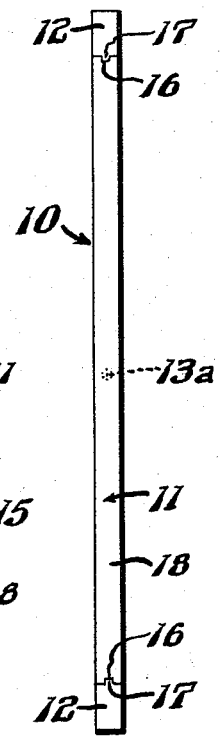
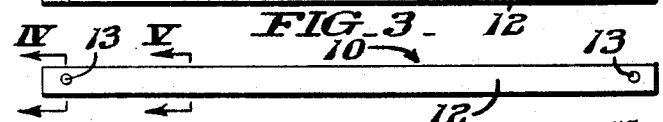
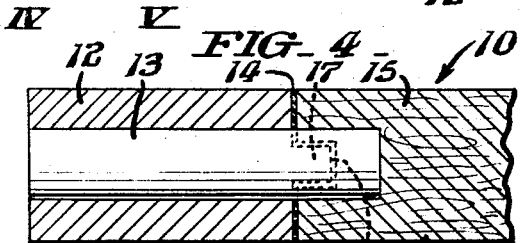
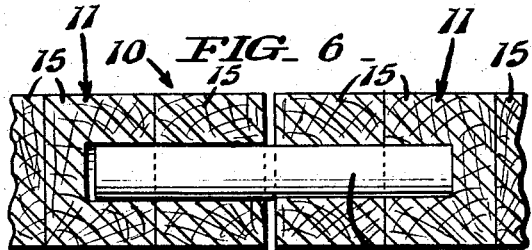
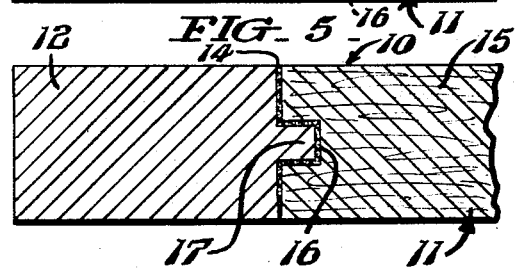
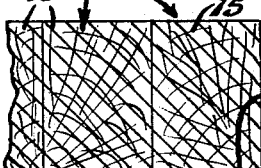
INVENTOR.
John J. Dau,
BY
Paul & Paul
ATTORNEYS.

United States Patent Office 3,314,206
Patented Apr. 18, 1967

3,314,206
DIMENSIONALLY STABLE LAMINATED
WOODEN WORK SURFACE
John J. Dau, Rosedale Drive, Pottstown, Pa. 19464
Filed Mar. 6, 1964, Ser. No. 350,014
3 Claims. (Cl. 52—415)

This invention relates to a laminated wooden structure, and more particularly it relates to a dimensionally stable work surface constituted principally of laminated lengths of lumber.

Because of the decline in the world supply of virgin lumber, it has been known for some time that extensive wooden surfaces may be constructed of laminations of small portions of lumber built up into an extended surface of the type desired. The well known disadvantages of this type of lumber construction are for example, warping due to shrinkage or expansion, checking, and lack of dimensional stability, particularly in wide sections or panels. The following U.S. patents represent several of the major approaches to avoiding these manifold disadvantages inherent in laminated lumber construction: U.S. Patent Nos. 140,680, 842,411, 974,984, 1,944,237, and 2,661,511.

The laminated wooden work surface of this invention completely eliminates some of the disadvantages of laminated wooden construction and minimizes many other common disadvantages of such construction. Other advantages of this invention, as well as the specific objects thereof will become readily apparent from a reading of the following description and drawings forming a part hereof.

FIGURE 1 represents a top plan view of a dimensionally stable work surface constructed in accordance with this invention.

FIGURE 2 represents a side elevational view of the work surface shown in FIGURE 1.

FIGURE 3 represents a front elevational view of the work surface shown in FIGURE 1.

FIGURE 4 is a sectional view taken along the lines and in the direction of the arrows IV—IV of FIGURE 3.

FIGURE 5 is a sectional view taken along the lines in the direction of the arrows V—V of FIGURE 3.

FIGURE 6 is a sectional view taken along the lines and in the direction of the arrows VI—VI of FIGURE 1.

FIGURE 7 is a sectional view taken along the lines and in the direction of the arrows VII—VII of FIGURE 1.

Referring now to the drawings, the dimensionally stable work surface 10 is shown as composed of a pair of laterally spaced body panels 11, end bolsters 12, retaining pins 13, and a bonding material 14 joining the end bolsters 12 to the body panels 11. In one specific embodiment of the so constructed work surface, a center levelling pin 13a connects the body panels 11 so as to permit lateral movement therebetween.

Body panels 11 are each constructed of a plurality of elongated solid wooden sections 15 which have been permanently laminated together by conventional methods to form the body panel 11 as shown. The body panels 11 are aligned with the end bolsters 12 by conventional tongue and groove construction, wherein a groove 16 formed at each end of the body panels 11 is joined with a tongue 17 formed mediately of one edge of the end bolsters 12. It is important to the construction of the article of this invention, that the bonding material 14 which joins the body panels 11 along the continuous length of the ends thereof to the end bolsters 12 have creep permissive characteristics. This is to say that the bonding material 14 must not rigidly set in its bonding state, since the normal expansion and contraction of the liminated sections 15 which will occur during the life thereof will cause fracturing of a rigid bonding material due to the end shrinkage of such sections 15. On the other hand, when a creep permissive bonding material 14 is utilized, the end shrinkage which does occur within each section 15 does not result in any fracture of the bonding material 14, thereby extending the life thereof. For example, the bonding material 14 may suitably be any elastomeric compound such as rubber or neoprene. This type of creep permissive compound may readily be applied during the construction of the article of this invention in solvent solutions prepared with solvents such as petroleum naptha, phenols, and the like.

The positioning of the retaining pins 13 with respect to the body panels 11 and the end bolsters 12 is also important in the construction of the article of this invention. Each retaining pin 13 is lodged in a drilled portion of the end bolster 12 adjacent each end thereof, with one end of the retaining pin 13 extending into a corresponding aligned drilled portion of one of the sections 15 which makes up a body panel 11. In this manner, it is seen that each body panel is positively secured to each end bolster adjacent the longitudinal edges of the composite work surface. It will therefore be seen that any expansion or contraction of the separate body panels 11 will take place at the center of the work surface 10 where the body panels 11 are spaced apart. Note should also be taken of the fact that this composite shrinkage or expansion of the laminated sections 15 which comprise the body panels 11, is facilitated by the creep permissive bonding material 14. As a result of this construction, it will be apparent that relatively little or no noticeable expansion or contraction of the laminated sections 15 between the location of the retaining pins 13 and the longitudinal edges 18 of the overall work surface 10 will occur, thereby assuring the dimensional stability of the perimeter of said work surface. It is known that wooden surfaces having end bolsters of the type shown herein, and not providing for relative expansion and contraction of the body panel as provided herein, results in an unsightly and difficult to maintain smooth perimeter because of relative shifting of the body panel with respect to the end bolster.

In those applications where an open space between the body panels 11, would be undesirable, such space can readily be filled with a material the same as or similar to the bonding material 14.

With reference to FIGURE 6, it is seen that the levelling pin 13a is inserted with a tight fit in one panel 11, while having a sliding fit in the other panel 11, thereby to facilitate relative expansion and contraction, while providing stability for non-lateral warping of the panels with relation to each other.

It should further be noted that if desired, the end bolsters 12 may be of metallic construction, as well as the wooden construction shown herein, the same being true for the retaining pins 13.

Having thus described my invention, I claim:

1. A compound lumber work surface comprising in combination (1) a plurality of laterally spaced body panels, each of said panels being constructed of a plurality of solid wooden sections in a laminated state, which sections form in said panels an extended planar work surface of generally rectangular shape, (2) an end bolster affixed to the exposed end grain of each of said body panels, said bolster covering the exposed end grain of each panel, (3) a creep permissive bonding agent interspersed between said end grain and said bolster whereby said body panels are held in their laterally spaced position and joined to the end bolsters by the bonding agent, and (4) pin means in each end bolster adjacent each end thereof, each of said pin means being mutually connected to the body panel contiguous therewith adjacent the perimeter of said work surface to render the perimeter of the work surface dimensionally stable.

2. The compound lumber work surface of claim 1 wherein said body panels have embedded therein and extending therebetween pin means for stabilizing the relative warpage thereof.

3. The compound lumber work surface of claim 1, wherein the opposing edges of said spaced body panels have interspersed therebetween a creep permissive bonding agent.

References Cited by the Examiner

UNITED STATES PATENTS

| | | | |
|---|---|---|---|
| 1,919,702 | 7/1933 | Murphy | 52—613 |
| 2,098,777 | 11/1937 | Elmendorf. | |
| 2,269,926 | 1/1942 | Crooks | 52—573 |
| 3,159,882 | 12/1964 | Slayter | 52—573 |
| 3,229,433 | 1/1966 | Miles | 52—573 |

FOREIGN PATENTS

| | | |
|---|---|---|
| 728,332 | 1955 | Great Britain. |
| 795,093 | 1958 | Great Britain. |

FRANK L. ABBOTT, *Primary Examiner.*

R. A. STENZEL, *Assistant Examiner.*